Figure 4:
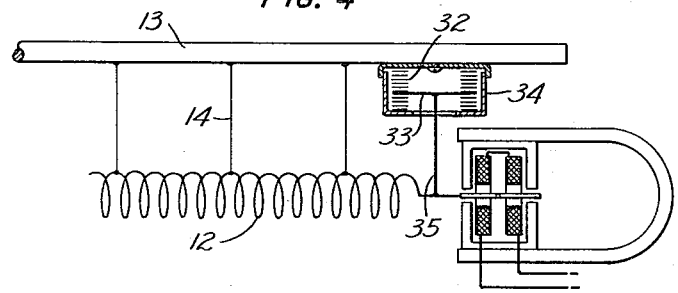

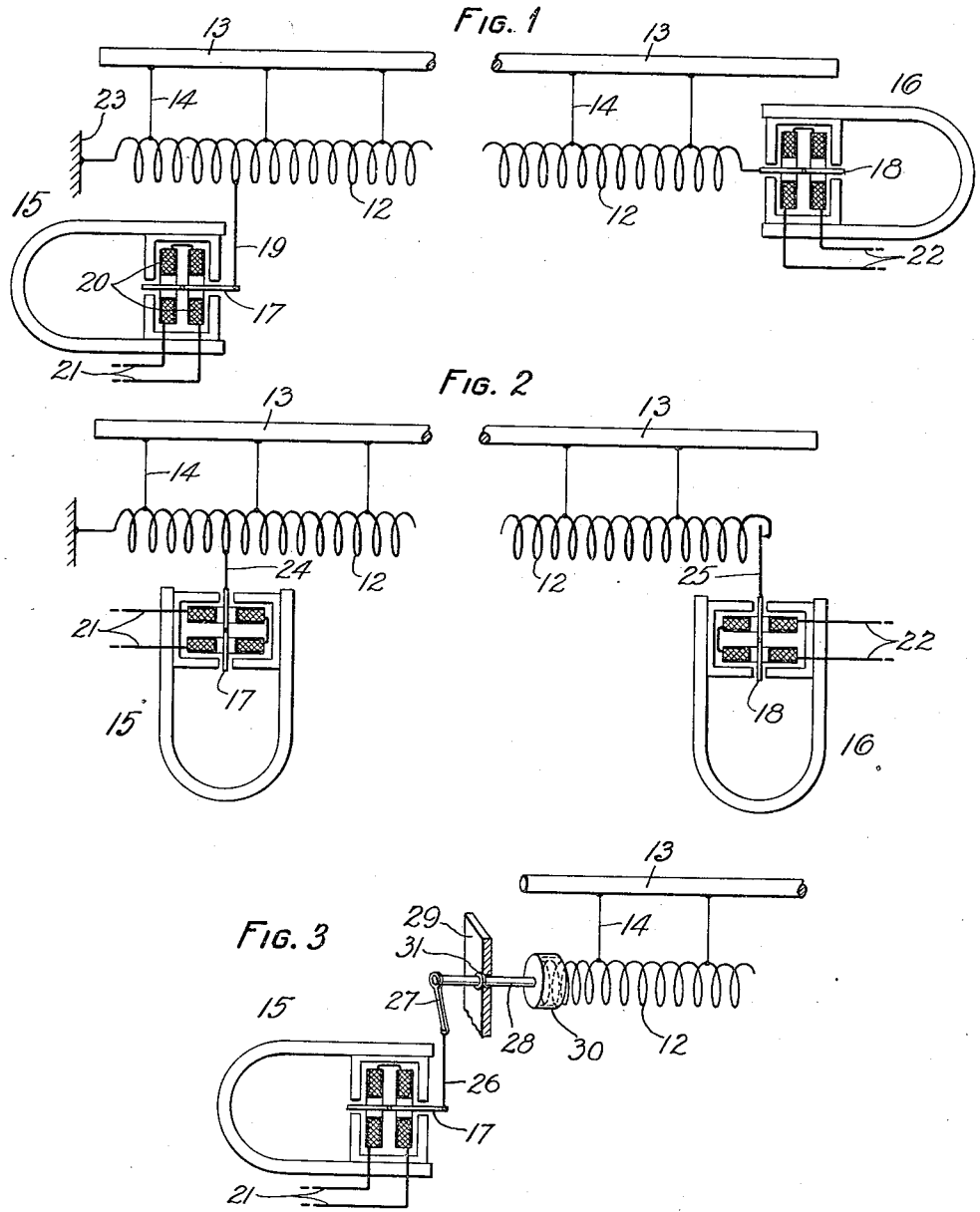

April 5, 1932. R. L. WEGEL 1,852,795
WAVE TRANSMISSION DEVICE
Filed Oct. 24, 1928 3 Sheets-Sheet 2

*INVENTOR*
*R. L. WEGEL*
BY
*G. H. Stevenson*
ATTORNEY

April 5, 1932. R. L. WEGEL 1,852,795
WAVE TRANSMISSION DEVICE
Filed Oct. 24, 1928  3 Sheets-Sheet 3

INVENTOR
R. L. WEGEL
BY
*J. H. Stevenson*
ATTORNEY

Patented Apr. 5, 1932

1,852,795

UNITED STATES PATENT OFFICE

RAYMOND L. WEGEL, OF NEW YORK, N. Y., ASSIGNOR TO BELL TELEPHONE LABORATORIES, INCORPORATED, OF NEW YORK, N. Y., A CORPORATION OF NEW YORK

WAVE TRANSMISSION DEVICE

Application filed October 24, 1928. Serial No. 314,611.

This invention relates to wave transmission, and more particularly to mechanical devices for the transmission of vibrations corresponding to speech.

An object of the invention is to obtain a very low velocity of propagation in the transmission of speech waves. Another object is to facilitate the delaying of speech waves in a telephone system, for example, in connection with systems in which voice operated relays are used for switching purposes.

In accordance with the invention a helical spring is used as a wave transmission line. By the proper choice of dimensions a wide range of propagation velocities may be obtained, extending as low as 40 feet per second, while at the same time the line is capable of transmitting, without serious distortion, speech frequencies up to 3000 c. p. s. or more. Waves may be transmitted as compressional vibrations of the spring, or as transverse vibrations, or as rotational vibrations, different velocities being obtained in each case. For compressional waves and rotational waves the velocity is substantially constant at all frequencies up to a limit which is dependent upon the pitch and diameter of the spring, and on the size of the wave used. For transverse waves the velocity increases approximately in proportion to the square root of the frequency, but this variation may be modied by placing the spring under tension, the effect of the tension being to increase the velocity at lower frequecies. The effect of tension on the velocity of propagation of compressional and rotational waves is negligible.

With respect to the propagation of vibrations the helical spring behaves at low frequencies like a solid bar or rod having small mass and elasticity per unit length, as determined by the size of the wire and the pitch and diameter of the helix. As the frequency increases, the wave length in the spring diminishes and in a certain range becomes comparable with the pitch of the helix. At this point the wave propagation becomes more complex; waves are no longer transmitted as simple vibrations of the compressional, transverse or rotational type, but tend to be transmitted as flexural vibrations of the wire itself, just as though the wire were stretched out straight. At frequencies in and above this transition range the impedance characteristic of the line is not well suited for efficient wave transmission, and accordingly it is desirable that for broad band transmission the spring should be so designed that the transition point occurs at a frequency above the desired range. An extended range of uniform transmission is most readily obtained by using a relatively large diameter wire wound in a helix of small diameter. The diameter of the wire should not however be unduly increased; if it is made about one-tenth the helix diameter satisfactory results are obtained, but if the diameter greatly exceeds this value the mode of wave propagation tends to change, and less satisfactory transmission characteristics are obtained.

To make use of the spring line as a mechanical link in a telephone system, electromagnetic driving and receiving devices are attached at the ends of the spring, and connected to the electrical lines. It is necessary that the coupling be so arranged that there is no reflection of the mechanical waves at the ends of the spring, this condition is provided for by certain features of the invention which provide for the inclusion of resistance in the line or at its ends, whereby wave reflection and resonance effects resulting therefrom are prevented.

On account of the low velocity of propagation, the spring line is particularly adapted for use as a wave delaying means, delays of the order of 1 second being obtainable with a comparatively short length of spring. Further, the variable velocity of the propagation of transverse waves, and the control of the velocity by the introduction of tension, enables the spring line to be used as a phase or velocity compensator for correcting velocity distortion such as occurs in loaded telephone lines.

Figure 5:
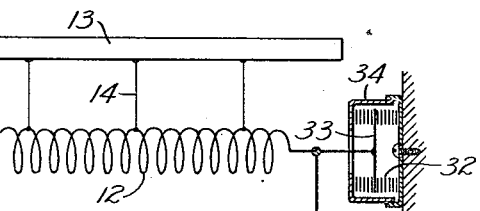
Figure 6:
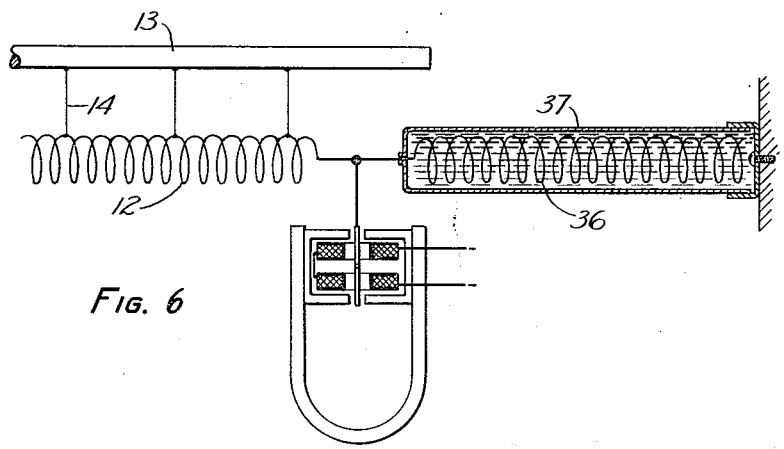
Figure 7:
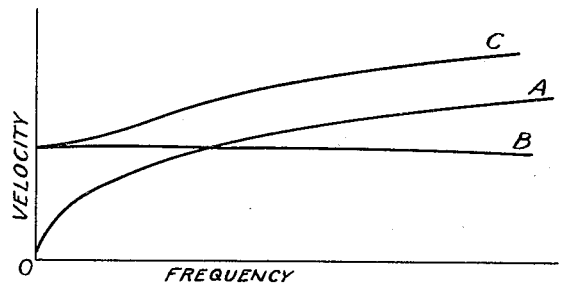
Figure 8:
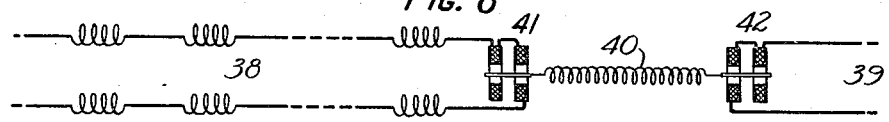
Figure 9:
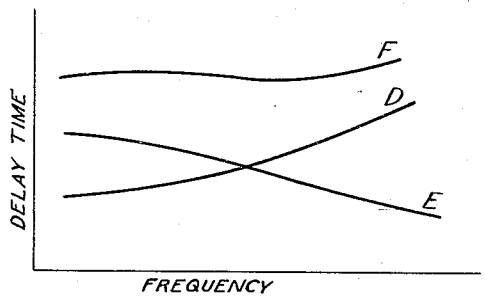
Figure 10:
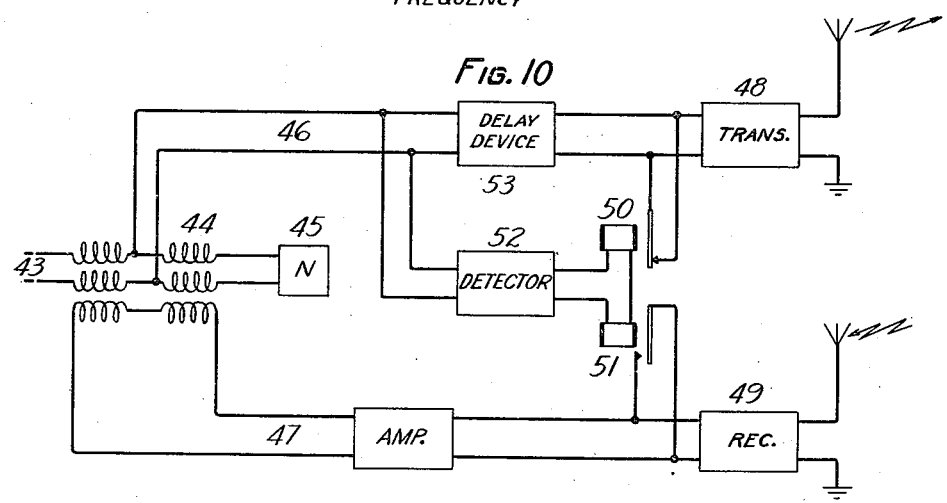

In the accompanying drawings, Fig. 1 illustrates one embodiment of the invention; Fig. 2 shows an alternative form of the invention in which a different mode of wave propagation is employed; Fig. 3 illustrates a modification of the invention whereby a third mode of wave propagation may be used; Fig. 4 shows an arrangement for terminating the system of Fig. 1 to prevent wave reflection; Figs. 5 and 6 illustrate alternative damping arrangements suitable for the system of Fig. 2; Fig. 7 is a diagram illustrating the operation of the invention; Fig. 8 shows in schematic form the invention embodied in a phase compensating system; Fig. 9 is a diagram illustrative of the operation of the system of Fig. 8; and Fig. 10 shows in schematic form the use of the invention in a voice operated switching system.

In the system shown in Fig. 1, a long helical spring 12 is arranged to constitute a mechanical wave transmission link between two sections 21 and 22 of an electrical line for the transmission of speech or other vibratory signals. Coupling between the ends of the spring and the electrical circuits is effected by electromagnetic translating devices 15 and 16, which may be of any suitable type, the coupling arrangement in this case being such that the spring is subject to a transverse, or lateral, vibration. The spring, which is preferably rather light, is supported at frequent intervals along its length by fine threads or silk fibres 14 from a rigid support 13, for example, a rod or a stretched cable. In the figure, the translating devices 15 and 16 are loud speaking receiver elements of well known type, comprising a centrally pivoted armature mounted between the pole pieces of a permanent magnet, and a driving coil encircling the armature.

The armature 17 of receiver element 15 is coupled to the spring by a rod 19 connected at one end of the armature, the arrangement being such that a rocking motion of the armature imparts a vertical motion to the connecting rod, and a transverse motion to the spring. When this coupling arrangement is used the connection may be made at a point some distance from the end of the spring, the end being supported on a rigid abutment 23. The driving coils 20 encircling the armature are connected in series with the electrical line 21. An alternative form of coupling is illustrated at the right of the figure, in which one end of the armature 18 of the receiver element is connected directly to the spring, the axis of the spring and that of the armature being in line, whereby the coupling is adapted for transverse vibrations. In this case any longitudinal tension in the spring is taken up by the pivot bearings of the armature, but since the spring is preferably light and under relatively small tension, this method of support is quite satisfactory. The same coupling arrangement may, of course, be used at both ends.

In operation, speech or other signal oscillations in the electrical line 21 produce responsive vibrations of the armature 17 which in turn imparts transverse vibrations of the same frequencies to the end of the spring. These are propagated along the spring and, on reaching the other end, cause the armature 18 to execute similar vibrations, whereby corresponding electrical oscillations are generated in the line 22. The mode of vibration of the spring is the same as in a solid rod of the same dimensions, that is, by the bending of the spring as a whole, but on account of the great flexibility a very much lower propagation velocity results. The system may be used with or without longitudinal tension in the spring, different operating characteristics being obtained in each case. If the spring is without tension the propagation velocity is proportional to the square root of the frequency, whereas if tension is present, the velocity has a more complex variation, being compounded by two components one of which is constant and dependent on the tension, and the other of which varies with the frequency in the manner mentioned above. The propagation velocities may be determined from the dimensions of the spring by the formulæ given below. For the general case in which the spring is under tension, the constant component of the velocity, denoted by $v_0$ is given by $$v_0^2 = \frac{a}{8\pi^2 R^4} p_1^2 \left(1 - \frac{p}{p_1}\right) \frac{\mu}{\rho} \quad (1)$$

where
  $a$ = the radius of the wire;
  $R$ = the radius of the helix to the centre of the wire;
  $p_1$ = the pitch of the winding under tension;
  $p$ = the pitch without tension;
  $\mu$ = the sheer modulus of elasticity; and
  $\rho$ = the density of the material of the wire.
The c. g. s. system of units is assumed, the velocity being found in centimeters per second.

The variable component of the velocity, denoted by $v_x$, is given by $$v_x^2 = \frac{2fap_1}{\pi R} \sqrt{\frac{2\mu}{\rho}} \quad (2)$$

in which $f$ denotes the frequency, the other symbols having the same meaning as in Equation 1. The resultant velocity, denoted by $v$, is found by combining the components in accordance with the formula $$v^2 = \frac{1}{2}\{v_0^2 + \sqrt{v_0^4 + 4v_x^4}\} \quad (3)$$

At very low frequencies the velocity approximates to the constant component, $v_0$, and at high frequencies it approaches the value of the variable component $v_x$. If the tension is removed the velocity is equal to $v_x$ at all frequencies, the value of $v_x$ being computed using the appropriate value of the pitch.

The velocity characteristics for transversely propagated waves are illustrated qualitatively by the curves of Fig. 7. Curve OA shows the variation with frequency of the component $v_x$; for this component the velocity is proportional to the square root of the frequency. The constant component, $v_0$, due to the longitudinal tension is represented by the horizontal line B, and the resultant velocity $v$, is represented by the curve C. By increasing the longitudinal tension the constant component is increased and the variation of the resultant velocity is diminished. This affords a means for controlling the propagation velocity characteristic of the system, whereby it may be adapted for phase, or velocity, compensation. An example of its use in this manner is described below.

The system of the invention may also be adapted to use other modes of wave propagation in the coiled spring. In Fig. 2 a modification is shown in which the waves are propagated by longitudinal or compressional vibrations. For this purpose the driving elements 15 and 16 are coupled to the spring with their armatures perpendicular to the axis thereof, so that the angular motion of the armatures communicates a longitudinal vibration to the spring. At the left of the figure the armature is shown coupled to an intermediate point on the spring by a rigid extension rod 24, the end of the spring being tied to a rigid abutment as in the system of Fig. 1. An alternative coupling arrangement is shown at the right of the figure, in which the end of the spring is hooked over the end of an extension 25 of the armature. In this case the end of the wire is preferably pointed and the extension rod provided with a conical hole in which the point of the wire engages, thereby eliminating any tendency for the drive to bend the spring transversely. A certain amount of longitudinal tension is desirable to keep the coupling engaged.

The velocity of propagation of compressional waves is substantially constant until a very high frequency is reached. The value is given by the equation $$v_1 = \frac{ap_1}{2\pi R^2}\sqrt{\frac{\mu}{2\rho}} \quad (4)$$

in which $v_1$ denotes the velocity in centimeters per second, the other symbols having the same meanings as before.

Insofar as longitudinal tension varies the pitch of the helix it changes the velocity proportionately, but the quotient of the velocity divided by the pitch remains constant. This quotient gives the number of turns traversed by the wave per second and is a convenient measure of the velocity.

The wave length of the compressional wave may be found by dividing the velocity by the frequency. As the frequency increases the wave length diminishes until at very high frequencies it may include only one or two turns of the helix. In this range the action of the spring begins to change and the wave propagation begins to involve a transverse bending of the wave itself, instead of a simple torsion, with the result that the velocity no longer remains constant. The frequency, $f_1$, at which the wave length theoretically would equal the pitch is given by $$f_1 = \frac{a}{2\pi R^2}\sqrt{\frac{\mu}{2\rho}}. \quad (5)$$

If it is desired to utilize the system for the transmission of speech, this frequency should be set somewhere above 10,000 c. p. s., so that at the highest speech frequencies the wave length will include at least three turns of the helix.

In one particular example the helix was constructed of spring steel wire .0508 cm. diameter, and had a radius of .220 cm., the pitch being about .07 cm. The calculated velocity for compressional waves, taking $\mu=8.4\times10^{11}$ and $\rho=7.8$, was 19,400 turns per second, which agreed very closely with the measured velocity. This corresponds to a velocity of about 1360 centimeters per second, or about 44 feet per second. In view of the extremely low propagation velocity a spring of dimensions such as given above is manifestly well adapted for use as a delaying means in telephone systems, for example in connection with echo suppressor circuits such as disclosed in U. S. Patent 1,585,702, granted May 25, 1926 to A. B. Clark. To secure a delay of one twentieth of a second, a length of spring a little more than a foot would be required.

In the particular example given above the wave length at 3000 c. p. s. includes more than six turns of the helix, so that the whole speech range of frequencies is well within the limits of the normal mode of propagation.

In Fig. 3 is shown a modification of the invention using a third mode of vibration of the helix. In this case the waves are propagated as torsional vibrations of the helix as a whole. Only one end of the system is shown, a similar arrangement being used at the other end. The driving element is coupled to the spring through a light spindle 28, having a cup member 30 at one end, and a lever arm 27 at the other end, to which the armature 17 is connected by means of a rod 26. The end of the spring is secured inside the cup member 30 so that a rotation of the spindle 28 imparts a twist to the helix. The spindle is supported in a bearing in a rigid supporting member 29, a collar 31 being provided to take up any tension in the spring.

Torsional waves are propagated with a substantially constant velocity, denoted by $v_2$, the value of which is given by the equation $$v_2 = \frac{ap_1}{4\pi R^2}\sqrt{\frac{E}{\rho}} \quad (6)$$

in which E is Young's modulus of elasticity for the material. For spring steel the value of E is $2.1 \times 10^{12}$, which gives a torsional propagation velocity approximately 12 per cent greater than the velocity of compressional waves.

As in the case of compressional waves, the normal mode of propagation of the torsional waves is maintained so long as the wave length includes several turns of the helix. Under this condition the velocity remains substantially constant at all frequencies, but, as the wave length becomes very short, the mode of propagation tends to change, and the propagation velocity becomes variable. The frequency, $f_2$, at which the wave length includes only one turn is given by $$f_2 = \frac{a}{4\pi R^2}\sqrt{\frac{E}{\rho}}. \quad (7)$$

In all three modes of vibration the spring transmits vibrations without loss or attenuation, but when it is coupled to terminal devices, as in the system of the invention, it is necessary that the terminal devices should be capable of absorbing all of the wave energy so that wave reflection will not occur. Otherwise standing waves, or resonance, will occur at certain frequencies and a non-uniform transmission characteristic will result. If the efficiency of the coupling between the mechanical and the electrical lines is very high, the vibration energy will be almost wholly transferred into the electrical circuits and very little will be reflected. With most types of electrical coupling devices however the efficiency of the energy transfer is rather low and additional damping means will be necessary to secure uniformity of the transmission characteristic.

Figs. 4, 5 and 6 show various arrangements for providing additional damping at the ends of the mechanical line. The arrangement shown in Fig. 4 is adapted for the damping of transverse vibrations. A light diaphragm, 33, is connected to the end of the spring by a light rod 35, and is held between two stacks of paper damping rings 32, which are assembled inside a circular box 34. The paper rings are packed sufficiently closely to ensure a rubbing action between them as the diaphragm moves, but not so closely as to clamp the diaphragm. In Fig. 5 the same damping device is shown, but arranged to provide damping for longitudinal vibrations. In Fig. 6 an alternative damping arrangement for longitudinal vibrations is shown. This comprises a rigidly supported tubular casing 37 in which is enclosed a light spring 36, preferably similar to the transmission spring, a straightened portion of which projects through a small hole in the end of the casing and engages with the end of the helix. The casing may be filled with a viscous grease, such as petroleum jelly, or with a heavy oil, or with a light packing of cotton soaked with oil. This arrangement provides the correct amount of damping in a very simple manner, for the reason that the spring 36, being similar to the transmission spring, but having a small distributed damping, acts as though it were an infinite extension of the line. Vibratory energy communicated to the damping spring is transmitted along it and gradually dissipated in the damping fluid so that practically none of it reaches the end of the line. For a smaller amount of damping a lighter spring and a less viscous fluid may be used.

Figs. 8 and 9 illustrate schematically the use of the invention as a velocity compensating means. The device is shown as a connecting link between a coil loaded telephone line 38 and an electrical circuit 39 to which the telephone terminal apparatus may be attached. The coupling elements are indicated schematically at 40 and 41, only the coils and the armatures being shown. The helical spring 40 is connected to the armatures so that the waves are transmitted as transverse vibrations. No damping means is shown, but the arrangement shown in Fig. 4 may be used if desired. As is well known, the propagation velocity in loaded telephone lines diminishes as the frequency increases, with the result that the higher frequency components of transmitted speech arrive at the end of the line later than the lower frequency components. If the line is very long the high frequency components persist at the end of a word giving rise to a peculiar whistling effect, which interferes with the intelligibility. By including the helical spring as a link in the system in the manner shown in Fig. 8, the waves are subjected to a delay of a compensating character, since the low frequency waves travel more slowly through the spring than do the high frequency waves. The compensation of the velocity is illustrated by the curves of Fig. 9 in which the times taken for waves of different frequencies to traverse the two portions of the system are shown. Curve D shows the time interval in the loaded line; curve E shows the time interval in the helical spring; and curve F shows the total time taken to traverse the two portions together. To secure the proper degree of compensation the length of the helical spring may be adjusted, and in addition some adjustment may be obtained by varying the tension in the spring. The latter adjustment is most effective at low frequencies from about 500 c. p. s. down.

Another application of the invention is illustrated schematically in Fig. 10, which shows one end of a two way radio telephone system. A telephone line 43 is connected through a bridge transformer 44 and balancing network 45 to two branch lines 46 and 47 one of which leads to a radio transmitter 48 and the other to a radio receiver 49. To prevent singing in the system and also to prevent the high powered transmitter from causing too much noise in the receiving branch, the system is arranged so that the transmitter is operative only when speech is being transmitted, and so that the receiver is out of action when the transmitter is operating. To secure this result a branch circuit including a detector 52 is connected to the transmitter circuit 46 and in the output circuit of the detector are connected two relays 50 and 51, which when operated remove a short circuit from the input leads of the transmitter and short circuit the output leads of the receiver. These relays are operated by the speech currents coming from the line 43, and should preferably be of a type that is rather slow in releasing in order that the transmission condition may be maintained during the intervals between words. To give the relays time to operate, and thereby prevent the initial word of a sentence being lost or mutilated a delay device 53 is connected between the branch point of the relay circuit and the transmitter. For this purpose the device shown in Fig. 2, or the modification in accordance with Fig. 3, may be used, the length of the helix being adjusted to give a delay of from .01 to .05 second. The arrangements using either compressional waves or torsional waves are preferred, since the velocity of propagation, and hence the delay time is uniform at all frequencies.

What is claimed is:

1. In a speech transmission system in combination, a mechanical wave transmission line comprising a helical spring having a length great enough to include several vibration wave lengths at the lowest frequency of speech, means for impressing mechanical vibrations corresponding to speech upon one end of said line, and means connected to the other end of said line for converting mechanical vibrations transmitted therethrough into corresponding oscillatory currents.

2. In a speech transmission system a mechanical wave transmission line comprising a helical spring having a wire diameter large enough and a helix diameter small enough to make the wave length of the vibrations in the helix greater than the pitch of the winding at all frequencies of speech and having a length great enough to include several vibration wave lengths at the lowest frequencies of speech, and in combination therewith means for impressing mechanical vibrations corresponding to speech upon one end of said line, and means connected to the other end of said line for converting mechanical vibrations transmitted therethrough into corresponding oscillatory currents.

3. In a speech transmission system a mechanical wave transmission line comprising a helical spring having a wire diameter large enough and a helix diameter small enough to make the wave length in the helix at least 3 times the pitch at a frequency of 3000 c. p s. and having a wave length great enough to include several vibration lengths at the lowest frequencies of speech, and in combination therewith means for impressing mechanical vibrations corresponding to speech upon one end of said line, and means connected to the other end of said line for converting mechanical vibrations transmitted therethrough into corresponding oscillatory currents.

4. In a signal transmission system, wave delaying means comprising a helical spring having such mass and elasticity per unit length that the propagation velocity of waves in the helix is at least as low as 100 feet per second at all speech frequencies and having a wave length great enough to include several vibration lengths at the lowest frequencies of speech, and in combination therewith means for impressing mechanical vibrations representing a signal upon one end of said line, and means connected to the other end of said line for converting mechanical vibrations transmitted therethrough into corresponding oscillatory currents.

5. In combination with a coil loaded telephone line, velocity compensating means comprising a helical spring, means for subjecting said spring to a longitudinal tension, and means for causing the speech currents in the telephone line to impart transverse vibrations to said spring.

6. In combination with a coil loaded line, velocity compensating means as described in claim 5, characterized in this that the longitudinal tension is adjusted to make the variation with frequency of the line of wave propagation in the spring substantially compensate the variation of the transmission interval in the loaded line over the range of speech frequencies.

In witness whereof, I hereunto subscribe my name this 22nd day of October, 1928.

RAYMOND L. WEGEL.